United States Patent
Al-Juhani et al.

(10) Patent No.: US 11,927,131 B1
(45) Date of Patent: Mar. 12, 2024

(54) ENERGY STORAGE UNDER DESERT ENVIRONMENTS

(71) Applicant: SAUDI ARABIAN OIL COMPANY, Dhahran (SA)

(72) Inventors: Ghaida Ahmed Al-Juhani, Dammam (SA); Faisal Mostafa, Dhahran (SA); Khadijah Alshadly, Dhahran (SA); Louai Altorkestani, Ras Tanura (SA); Mohammed Al-Khawajah, Al Ahsa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/156,019

(22) Filed: Jan. 18, 2023

(51) Int. Cl.
*F02C 6/16* (2006.01)
*F02C 1/04* (2006.01)
*F17C 1/00* (2006.01)

(52) U.S. Cl.
CPC ............... *F02C 6/16* (2013.01); *F02C 1/04* (2013.01); *F17C 1/007* (2013.01); *F17C 2203/0685* (2013.01); *F17C 2221/013* (2013.01); *F17C 2223/0123* (2013.01); *F17C 2227/0157* (2013.01); *F17C 2227/0302* (2013.01);
(Continued)

(58) Field of Classification Search
CPC .... F02C 6/16; F02C 1/04; F17C 1/007; F17C 2203/0685; F17C 2221/013; F17C 2223/0123; F17C 2227/0157; F17C 2227/0302; F17C 2227/0341; F17C 2270/016; F17C 2270/0581

USPC ............. 60/650, 659, 682–684, 641.2–641.4
See application file for complete search history.

(56) References Cited

U.S. PATENT DOCUMENTS 7,490,657 B2 * 2/2009 Ueyama ................. F24T 10/20
165/45
10,829,913 B1 * 11/2020 Ahmed ................... C02F 1/441
(Continued)

FOREIGN PATENT DOCUMENTS

| CN | 114962976 A | 8/2022 |
|---|---|---|
| WO | 2015007600 A1 | 1/2015 |
| WO | 2019080219 A1 | 5/2019 |

OTHER PUBLICATIONS

Pimm, A. et al; Underwater compressed air energy storage; Storing Energy (Second Edition); 2022, pp. 157-177.
(Continued)

*Primary Examiner* — Hoang M Nguyen
(74) *Attorney, Agent, or Firm* — Vorys, Sater, Seymour and Pease, LLP (57) ABSTRACT

The present disclosure is related to systems and/or methods for energy storage in desert environments. Various embodiments described herein include a system for subterranean energy storage. The system can comprise a subterranean flexible storage vessel coupled to a heat exchanger. The heat exchanger can be configured to supply a cooled compressed gas stream to the subterranean flexible storage vessel. Further, the subterranean flexible storage vessel can be at least partially surrounded by sand. Additionally, the system can comprise a turbine generator coupled to the subterranean flexible storage vessel. The subterranean flexible storage vessel can be configured to supply a pressurized gas stream that is heated by the sand to the turbine generator.

17 Claims, 3 Drawing Sheets

(52) U.S. Cl.
CPC .......................... *F17C 2227/0341* (2013.01);
*F17C 2270/016* (2013.01); *F17C 2270/0581*
(2013.01)

(56) References Cited

U.S. PATENT DOCUMENTS

| | | | |
|---|---|---|---|
| 2008/0034756 A1* | 2/2008 | Spalte | F02C 6/16 60/641.3 |
| 2008/0155985 A1* | 7/2008 | Labrador | F01K 27/00 60/698 |
| 2009/0090109 A1* | 4/2009 | Mills | F24T 10/30 60/659 |
| 2015/0069758 A1* | 3/2015 | Davidson | F01K 25/10 60/659 |
| 2015/0267612 A1* | 9/2015 | Bannari | F02C 6/16 60/659 |

OTHER PUBLICATIONS

Kantharaj, B. et al. Compressed air energy storage with liquid air capacity extension; Applied Energy 2015; pp. 152-164.

* cited by examiner

ENERGY STORAGE UNDER DESERT ENVIRONMENTS

FIELD OF THE DISCLOSURE

The present disclosure relates generally to energy storage systems and/or methods that utilize subterranean storage vessels in desert environments and, more particularly, to using energy surpluses to compress gas into subterranean flexible storage vessels that can absorb ambient heat from a surrounding sand environment to capture and store energy for subsequent electrical operations.

BACKGROUND OF THE DISCLOSURE

Clean energy sources (e.g., solar, wind, and natural gas energy) are being increasingly implemented as alternatives to petroleum fuels in an effort to reduce carbon emissions. For example, solar energy systems utilize photovoltaic cells in solar panels and/or transparent photovoltaic glass to generate electricity; wind energy systems harness the wind to power turbines that translate mechanical forces to electricity; and natural gas energy systems combust gases such as methane, ethane, butane, and propane in a process that emits substantially less pollution than other fossil fuel sources. However, these clean energy sources can be affected by instability and climate conditions that can inhibit the generation of power during times of peak demand.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a system for subterranean energy storage is provided. The system can comprise a subterranean flexible storage vessel coupled to a heat exchanger. The heat exchanger can be configured to supply a cooled compressed gas stream to the subterranean flexible storage vessel. Further, the subterranean flexible storage vessel can be at least partially surrounded by sand. Additionally, the system can comprise a turbine generator coupled to the subterranean flexible storage vessel. The subterranean flexible storage vessel can be configured to supply a pressurized gas stream that is heated by the sand to the turbine generator.

In another embodiment, method for subterranean energy storage is provided. The method can comprise cooling a hot compressed gas stream via a heat exchanger to form a cooled compressed gas stream. The method can also comprise supplying the cooled compressed gas stream to a subterranean flexible storage vessel that is at least partially surrounded by sand. The subterranean flexible storage vessel can be coupled to a turbine generator. The method can further comprise heating the cooled compressed gas stream within the subterranean flexible storage vessel via conduction with the sand. The heating can pressurize the subterranean flexible storage vessel.

In a further embodiment, another system of energy storage is provided. The system can comprise a flexible storage vessel positioned within a body of desert sand. The flexible storage vessel can be configured to hold a cooled compressed gas. The system can also comprise a turbine generator coupled to the flexible storage vessel. The cooled compressed gas is pressurized by conduction heating from the body of desert sand to render a pressurized gas. Also, the system can comprise a valve configured to control supply of the pressurized gas to the turbine generator.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Embodiments of the present disclosure will now be described in detail with reference to the accompanying figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Energy demands can follow a seasonal cycle, depending on the weather patterns of a region. For example, energy demands in a region may vary markedly between winter and summer. However, clean energy sources are often unable to fluctuate in alignment with the energy demand. Thus, there is a desire to store excess energy, generated when demand is low, for later use when the energy demand increases. However, conventional battery systems can be prone to degradation, exhibiting a gradually diminishing energy storage capacity. Additionally, battery systems can be costly to maintain and have performance metrics that vary based on the climate.

Embodiments in accordance with the present disclosure generally relate to energy storage systems and/or methods that utilize a pressurized flexible storage vessel to store cooled compressed gas (e.g., carbon dioxide, $CO_2$). In various embodiments described herein, the energy storage system can compress a gas to produce a hot compressed gas stream, which is then fed to a heat exchanger. Heat is removed from the compressed gas stream and used to power a turbine generator to produce electricity, while the cooled compressed gas byproduct is supplied to a subterranean flexible storage vessel. For example, the flexible storage vessel can be positioned under a terrain of sand, such that sand surrounds the vessel. As the sand is heated (e.g., by the Sun and/or geothermal activities), the stored compressed gas is likewise heated and pressurized. Subsequently, the stored compressed gas can be vented from the flexible storage vessel to power one or more turbine generators at a later point in time.

Advantageously, various embodiments described herein can leverage the high specific heat capacity of sand to capture thermal energy via the subterranean vessels of compressed gas. For instance, heat absorbed by the sand can be provide additional energy to the reserve of compressed gas, thereby mitigating overall energy loss over long durations of storage. Further, where carbon dioxide generated from other manufacturing, industrial, and agricultural practices is utilized as the gas medium, the embodiments described herein can reduce the amount of carbon emissions released into the atmosphere.

Figure 1:
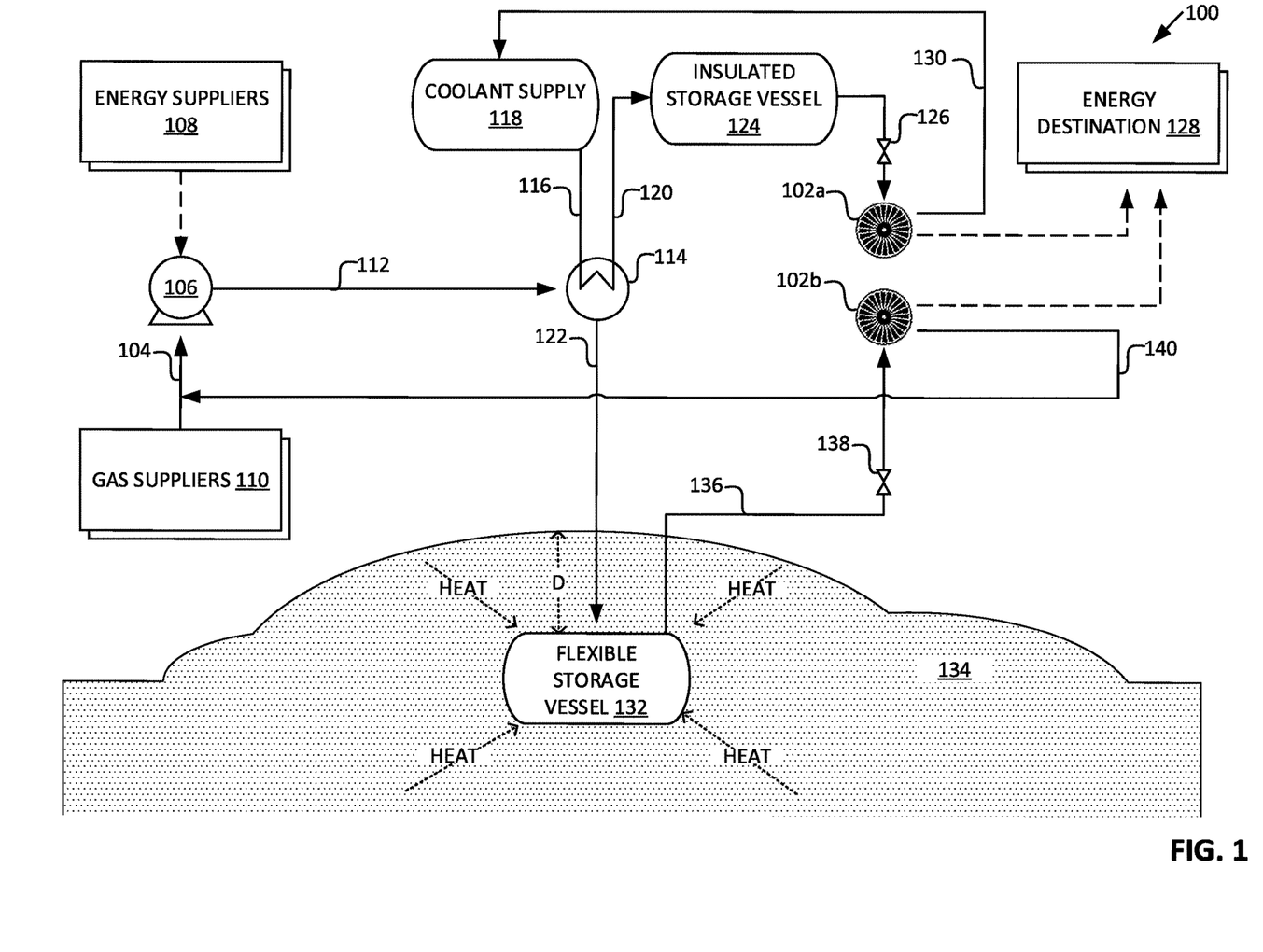
FIG. 1 is a diagram of a non-limiting example energy storage system that can store excess energy via compressed gas held in a subterranean desert environment in accordance with one or more embodiments described herein.

FIG. 1 illustrates a diagram of a non-limiting example energy storage system 100 that can be employed in desert terrain to provide a sustainable and low carbon footprint approach to storing energy resources in accordance with one or more embodiments described herein. As shown in FIG. 1, the energy storage system 100 can include one or more piping circuits to carry and/or route fluids between various features of the system 100. For example, FIG. 1 depicts the one or more piping circuits via solid arrows, where the direction of the arrows can indicated the direction of flow within the piping circuit. In various embodiments, the one or more fluid streams (e.g., gas streams and/or liquid streams) can be housed, carried, and/or routed within the piping circuit. For instance, respective sections of the piping circuit can route respective fluid streams between components of the system 100 in accordance with various embodiments described herein.

In various embodiments, the energy storage system 100 can utilize compressed gas as a medium to power one or more turbine generators 102 and/or store excess energy. For example, a gas stream 104 can be provided to one or more compressor units 106, which can be powered by one or more energy suppliers 108. As shown in FIG. 1, the gas stream 104 can be provided by one or more gas suppliers 110. In one or more embodiments, the one or more gas suppliers 110 can be, for example: a manufacturing facility, an industrial facility, an agricultural facility, a processing facility, a combination thereof, and/or the like. Further, the gas stream 104 can include, but is not limited to: one or more greenhouse gases (e.g., carbon dioxide, methane, and nitrous oxide), air, natural gas, a fuel gas, an industrial useful gas, a combination thereof, and/or the like. In various embodiments described herein, the gas stream 104 includes carbon dioxide ($CO_2$), air, and/or a combination thereof. By utilizing carbon dioxide produced by other manufacturing, processing, and/or agricultural facilities as the gas stream 104, the energy storage system 100 can reduce carbon emissions that would have otherwise been released into the atmosphere.

As shown in FIG. 1, the one or more energy suppliers 108 can be electrically coupled (e.g., delineated by a dashed line in FIG. 1) to the one or more compressor units 106. Example energy suppliers 108 can include, but are not limited to: wind turbines, solar panels, tidal stream generators, hydroelectric power stations, gas-fired power stations, coal-fired power stations, nuclear power stations, a combination thereof, and/or the like. In one or more embodiments described herein, the one or more energy suppliers 108 are green energy power sources, such as a wind turbines, solar panel farms, and/or gas-fired power stations. At times when electrical power generated by the green energy power sources exceeds power demands, the excess power can be used to operate the one or more compressor units 106; thereby the excess power can be stored by the energy storage system 100.

In various embodiments, the one or more compressor units 106, powered by the energy suppliers 108, can compress the gas stream 104 into a hot compressed gas stream 112 (e.g., thereby storing the excess power generated by the energy suppliers 108). Example types of compressor units 106 can include, but are not limited to: reciprocating (e.g., single-acting, double-acting, diaphragm), rotary (e.g., lobe, liquid ring, screw, vane), centrifugal, and/or axial air compressors. For example, as the gas stream 104 is compressed, the temperature and pressure of the gas can increase. A temperature of the hot compressed gas stream 112 can range from, for example, greater than or equal to −60 degrees Celsius (° C.) and less than or equal to 60° C. A pressure of the hot compressed gas stream 112 can range from, for example, greater than or equal to 0 and less than or equal to 50 bar.

The energy storage system 100 can supply the hot compressed gas stream 112 to one or more heat exchangers 114. In various embodiments, the one or more heat exchangers 114 can be recuperative (e.g., indirect or direct heat exchangers) or regenerative (e.g., static or dynamic heat exchangers). Further, the one or more heat exchangers 114 can be single-phase or two-phase heat exchangers. Example types of heat exchangers 114 can include, but are not limited to: shell and tube heat exchangers, double pipe heat exchangers, plate heat exchangers, condensers, and/or evaporators.

For instance, FIG. 1 depicts an example embodiment in which the energy storage system 100 includes a shell and tube heat exchanger to cool the hot compressed gas stream 112. As shown in FIG. 1, a coolant stream 116 can be provided to the one or more heat exchangers 114 from one or more coolant supplies 118. Thereby, heat can be exchanged from the hot compressed gas stream 112 to the coolant stream 116 to produce a heated coolant stream 120 and a cooled compressed gas stream 122. For instance, the cooled compressed gas stream 122 can have a temperature of 30° C. or less. Example coolants that can be stored in the coolant supply 118 and composed in the coolant stream 116 can include, but are not limited to: water, glycol water solutions, dielectric fluids, polyalphaolefins ("PAO"), a combination thereof, and/or the like. In one or more example embodiments, the coolant stream 116 can comprise water, where the heat exchanger 114 can be a two-phase shell and tube heat exchanger. For instance, the hot compressed gas stream 112 can evaporate the water (e.g., the coolant stream 116) to form steam (e.g., the heated coolant stream 120) and the cooled compressed gas stream 122.

The heated coolant stream 120 can be stored in one or more insulated storage vessels 124. In one or more embodiments, the insulated storage vessels 124 can be maintained at a predetermined pressure and vented to power one or more first turbine generators 102a (e.g., a gas-driven turbine generator). For example, supply of the heated coolant stream 120 (e.g., steam) from the insulated storage vessel 124 to the first turbine generator 102a can be controlled via a first valve 126. Example types of valves that can be employed herein include, but are not limited to: globe valves, butterfly valves, needle valves, a combination thereof, and/or the like. In accordance with various embodiments, the valves described herein can include remote controlled valves, manual controlled valves, hydraulic controlled valves, and/or the like. In various embodiments, the first valve 126 can regulate the pressure of the insulated storage vessel 124 such that the pressure ranges from, for example, greater than or equal to about 0 bar and less than or equal to about 50 bar. Where the heated coolant stream 120 is steam, the one or more first turbine generators 102a can be one or more steam-driven turbine generators.

The one or more first turbine generators 102a can be electrically coupled (e.g., delineated by dashed lines in FIG. 1) to an energy destination 128. Example energy destinations 128 can include, but are not limited to: a power grid, one or more batteries, an electrical device, a combination thereof, and/or like. For instance, the energy destination 128 can be a battery array, where the electrical power produced by the one or more first turbine generators 102a (e.g., steam-driven turbine generators) can be stored for future use. In another instance, the energy destination 128 can be a power grid or electrical device, where the electrical power produced by the one or more first turbine generators 102a (e.g., steam-driven turbine generators) can be used for various electrical demands. Additionally, in one or more embodiments, a recycled coolant stream 130 can be captured from the one or more first turbine generators 102a and used to re-supply the coolant supply 118. For instance, steam used to power the one or more first turbine generators 102a can be recaptured as the recycled coolant stream 130, whereupon it can be condensed and returned to the water supply (e.g., coolant supply 118) for subsequent heat exchange operations.

In various embodiments, the cooled compressed gas stream 122 can be supplied from the one or more heat exchangers 114 to one or more flexible storage vessels 132. As shown in FIG. 1, the one or more flexible storage vessels 132 can be positioned in a subterranean sand environment. For example, the one or more flexible storage vessels 132 can be at least partially surrounded by sand 134. For instance, the energy storage system 100 can be employed in a desert environment, where the one or more flexible storage vessels 132 can be buried within the sand 134. In one or more embodiments, the one or more flexible storage vessels 132 can be positioned within the sand 134 at a depth "D" ranging from, for example, greater than or equal to 0.5 meters (m) and less than or equal to 1.5 m (e.g., at a depth D of at least 0.5 meters). For instance, the depth D at which the vessels 132 can be positioned can vary based on moisture content of the sand 134, grain size and distribution of the sand 134, and/or the geology of the location. In some embodiments, the one or more vessels 132 can be partially submerged in the sand 134. In various embodiments, the sand 134 can be mainly composed of quartz, feldspar, muscovite, calcite, and/or gypsum. For example, the sand 134 can be desert sand derived from residual minerals of sandstone and/or granite weathering. In one or more embodiments, the sand 134 can be in direct contact with the one or more flexible storage vessels 132.

As the sand 134 heats due to ambient environmental conditions, the cooled compressed gas stored in the flexible storage vessel 132 can also be heated (e.g., as delineated by dotted "HEAT" arrows), thereby increasing the pressure and temperature within the one or more flexible storage vessels 132. For example, the Sun can heat the sand 134 comprised within a desert environment; and the heat absorbed by the sand 134 can be transferred to the flexible storage vessels 132, and thereby the cooled compressed gas stored within. Thereby, the Sun can heat the sand 134 by radiation, and the sand 134 can heat the one or more flexible storage vessels 132 by conduction. In another example, one or more geothermal energy sources can heat the sand 134, which can then transfer the absorbed heat to the one or more flexible storage vessels 132. In one or more embodiments, the sand 134 can be heated via one or more additional heating means, including, but not limited to: focused solar energy using directed reflective surfaces, coil heating embedded in the sand 134 (e.g., using heat derived from solar panels).

In various embodiments, the volume of the flexible storage vessels 132 can adjust to accommodate the introduction of additional cooled compressed gas stream 122 and/or the increase in pressure resulting from the ambient heating provided by the sand 134. In one or more embodiments, the one or more flexible storage vessels 132 can comprise multiple layers, with one or more inner layers being elastic and one or more outer layers being rigid. For example, the one or more inner layers can expand or contract depending on the volume, temperature, and/or pressure of the stored gas; while the one or more outer layers can provide structural integrity to the flexible storage vessels 132 under the weight of the adjacent sand 134. Example materials that can comprise the one or more inner layers of the flexible storage vessels 132 can include, but are not limited to: high-strength woven fabrics, rubbers (e.g., chloroprene rubber), polyethylene materials (e.g., chlorosulfonated polyethylene), polyurethane, polyesters, composites thereof, a combination thereof, and/or the like. For instance, the one or more inner layers can serve as a flexible airbag, and the one or more outer layers can serve as a rigid shell from which the airbag can be suspended and/or encapsulated. In one or more embodiments, the rigid shell can be composed of a metal, a ceramic, and/or a polymer. As described above, the one or more outer layers, and thereby the one or more inner layers, can be heated by conduction with the heated sand 134.

As the temperature of the stored compressed gas increases, the flexible storage vessels 132 can expand and the pressure within the flexible storage vessels 132 can increase. At a predefined pressure, or when supplemental energy supplies are desired, the one or more flexible storage vessels 132 can be vented to supply a pressurized gas stream 136 to one or more second turbine generators 102b. For example, the supply of the pressurized gas stream 136 to the one or more second turbine generators 102b can be controlled via one or more second valves 138.

The one or more second turbine generators 102b can be electrically coupled (e.g., delineated by dashed lines in FIG. 1) to the energy destination 128. For instance, the energy destination 128 can be a battery array, where the electrical power produced by the one or more second turbine generators 102b (e.g., gas-driven turbine generators) can be stored for future use. In another instance, the energy destination 128 can be a power grid or electrical device, where the electrical power produced by the one or more second turbine generators 102b (e.g., gas-driven turbine generators) can be used for various electrical demands. Alternatively, in one or more embodiments, the heated coolant stream 120 and the pressurized gas stream 136 can be supplied to the same turbine generator 102. For example, in one or more embodiments, the insulated storage vessel 124 and the one or more flexible storage vessels 132 can be coupled to a common turbine generator 102, which in turn can be coupled to the one or more energy destinations 128. For instance, the turbine generator 102 can be powered by the heated coolant stream 120 during a first time period and powered by the pressurized gas stream 136 during a second time period.

Additionally, in one or more embodiments, a recycled gas stream 140 can be captured from the one or more second turbine generators 102b and used to re-supply the gas stream 104. For instance, where the pressurized gas stream 136 is heated carbon dioxide, the one or more second turbine generators 102b can be carbon dioxide-driven turbine generator. Further, heated gas (e.g. heated carbon dioxide) used to power the one or more second turbine generators 102b (e.g., carbon dioxide-driven turbine generators) can be captured as the recycled gas stream 140, which can be re-supplied to the one or more compressor units 106 along with the gas stream 104 (e.g., the recycled gas stream 140 can be integrated with the gas stream 104).

Advantageously, the energy storage system 100 can store the compressed gas in the subterranean flexible storage vessels 132 until energy demands prompt a supplemental supply of energy to the one or more energy destinations 128. Further, while kept in storage, the compressed gas can absorb additional energy from ambient heating conditions (e.g., solar and/or geothermal heating conditions) facilitated by the surrounding sand 134 environment. Thus, excess energy generated by the one or more energy suppliers 108 can be saved for later use via the compressed gas stored in the subterranean sand environment.

Figure 2:
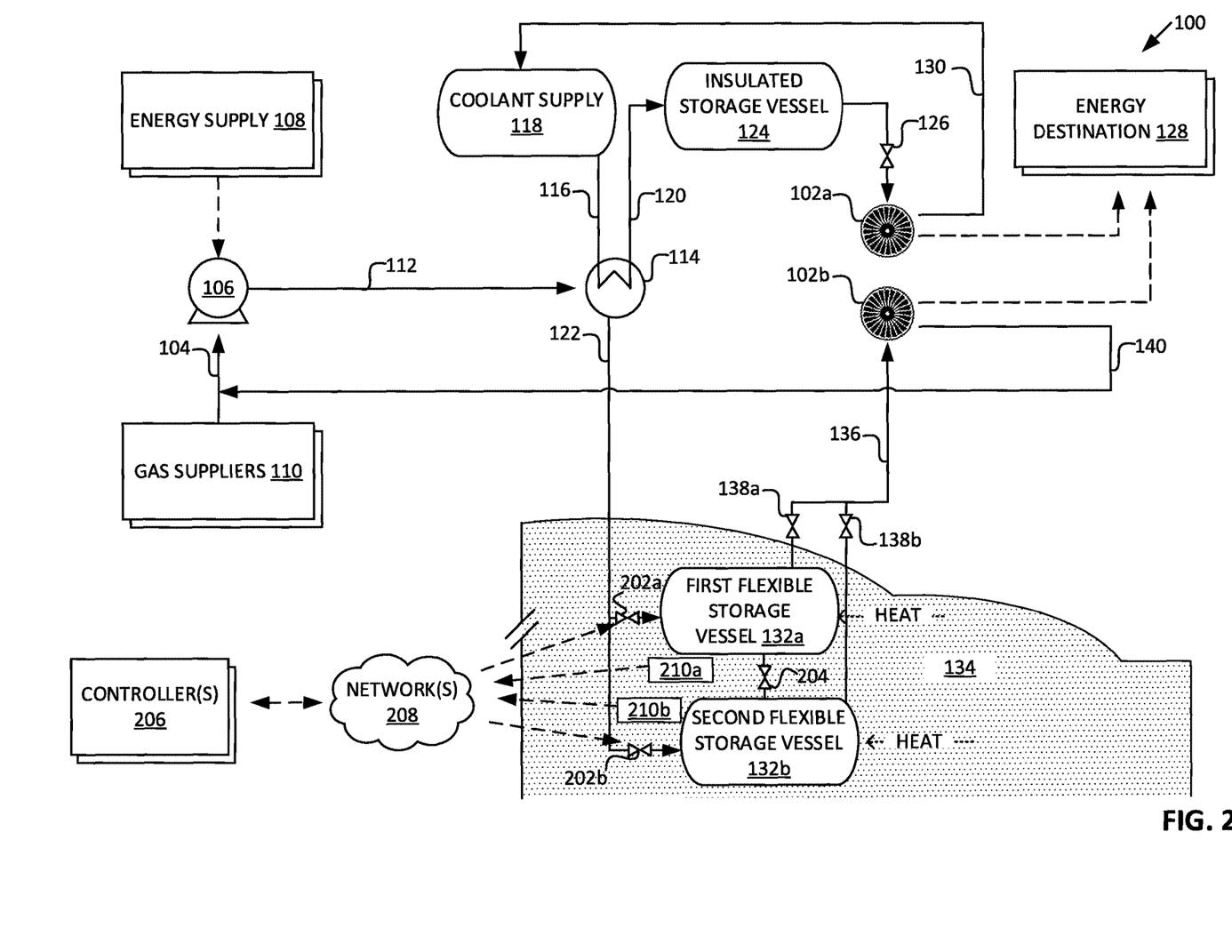
FIG. 2 is a diagram of a non-limiting example energy storage system that can utilize a plurality of subterraneous storage vessels to capture energy to power one or more turbine generators in accordance with one or more embodiments described herein.

FIG. 2 illustrates a diagram of the non-limiting example energy storage system 100 comprising a plurality of flexible storage vessels 132 in accordance with one or more embodiments described herein. For example, FIG. 2 depicts an example embodiment comprising a first flexible storage vessel 132a and a second flexible storage vessel 132b. As shown in FIG. 2, each of the flexible storage vessels 132 can be coupled to the cooled compressed gas stream 122 via a respective third valve 202. For example, third valve 202a can control the flow of the cooled compressed gas stream 122 into the first flexible storage vessel 132a, and third valve 202b can control the flow of the cooled compressed gas stream 122 into the second flexible storage vessel 132b. Additionally, each of the flexible storage vessels 132 can be coupled to each other. For example, a fourth valve 204 can control the flow of compressed gas between the first flexible storage vessel 132a and the second flexible storage vessel 132b.

Via operation of the one or more third valves 202 and/or fourth valve 204, the energy storage system 100 can control the storage of compressed gas within each flexible storage vessel 132. For instance, storage of the compressed gas can be directed to the first flexible storage vessel 132a while one or more maintenance operations are performed on the second flexible storage vessel 132b. Additionally, while each flexible storage vessel 132 is shown coupled to the same second turbine generator 102b in FIG. 2, the architecture of the energy storage system 100 is not so limited. For example, one or more first flexible storage vessels 132a can be coupled to a different turbine generator 102 than one or more second flexible storage vessels 132b (e.g., where the turbine generators 102 can be operably coupled to respective energy destinations 128).

In one or more embodiments, the energy storage system 100 can direct the cooled compressed gas stream 122 to respective flexible storage vessels 132 based on environmental conditions surrounding the flexible storage vessels 132. For example, the first flexible storage vessel 132a and the second flexible storage vessel 132b can be separated from each other by a sufficient distance such that the sand 134 surrounding the first flexible storage vessel 132a exhibits a different temperature than the sand 134 surrounding the second flexible storage vessel 132b. In such case, the energy storage system 100 may direct the cooled compressed gas stream 122 to the flexible storage vessel 132 likely to experience the most heating in the near future or likely to retain the most heat during a cool season. For instance, the first flexible storage vessel 132a and the second flexible storage vessel 132b may be separated from each other by a lateral distance (e.g. a horizontal distance) and positioned in areas that experience different heating and/or cooling weather patterns. In another instance, the first flexible storage vessel 132a and the second flexible storage vessel 132b may be separated from each other by a vertical distance (e.g., may be positioned at different depths D, as shown in FIG. 2), where ambient heating of the sand 134 can vary based on depth.

In various embodiments, the one or more valves (e.g., first valve 126, second valve 138, third valve 202, and/or fourth valve 204) can be operably coupled to one or more or more controllers 206 via one or more networks 208. For example, the third valves 202 can be remote control valves that can be turned on or off via the one or more controllers 206.

In one or more embodiments, the one or more networks 208 can comprise one or more wired and/or wireless networks, including, but not limited to: a cellular network, a wide area network ("WAN"), a local area network ("LAN"), a combination thereof, and/or the like. One or more wireless technologies that can be comprised within the one or more networks 208 can include, but are not limited to: wireless fidelity ("Wi-Fi"), a WiMAX network, a wireless LAN ("WLAN") network, BLUETOOTH® technology, a combination thereof, and/or the like. In various embodiments, the one or more networks 208 can comprise one or more transmission lines (e.g., copper, optical, or wireless transmission lines), routers, gateway computers, and/or servers.

In various embodiments, the one or more controllers 206 can include one or more processing units. The one or more processing units can comprise any commercially available processor. For example, the one or more processing units can be a general purpose processor, an application-specific system processor ("ASSIP"), an application-specific instruction set processor ("ASIPs"), or a multiprocessor. For instance, the one or more processing units can comprise a microcontroller, microprocessor, a central processing unit, and/or an embedded processor. In one or more embodiments, the one or more processing units can include electronic circuitry, such as: programmable logic circuitry, field-programmable gate arrays ("FPGA"), programmable logic arrays ("PLA"), an integrated circuit ("IC"), and/or the like. The one or more processing units and/or electronic circuitry can enable the one or more controllers 206 to control operation of the one or more valves (e.g., third valves 202 and/or fourth valve 204) in accordance with one or more user input commands and/or logic algorithms.

For example, the one or more controllers 206 can control operation of the one or more third valves 202 based on: a measured temperature of the sand 134 at proximal locations to the one or more flexible storage vessels 132; and/or a pressure of the one or more flexible storage vessels 132. For instance, one or more sensor units 210 can be positioned near and/or within the respective flexible storage vessels 132, and can be operably coupled to the one or more controllers 206 via one or more the one or more networks 208. FIG. 2 illustrates an example embodiment in which a first sensor unit 210a is positioned near and/or within the first flexible storage vessel 132a and a second sensor unit 210b is positioned near and/or within the second flexible storage vessel 132b. The one or more sensor units 210 can include one or more temperature sensors that can transmit temperature data to the one or more controllers 206, where the temperature data can characterize the temperature of the sand 134 and/or the flexible storage vessel 132. Additionally, the one or more sensor units 210 can include one or more pressure sensors that can transmit pressure data to the one or more controllers 206, where the pressure data can characterize an internal pressure being experienced by the flexible storage vessel 132.

The one or more controllers 206 can thereby operate the third valves 202 to control the distribution of the cooled compressed gas stream 122 amongst the flexible storage vessels 132 to optimize energy storage within the system 100 based on the temperature and/or the pressure data. For example, the one or more controllers 206 can be configured to open third valves 202 associated with flexible storage vessels 132 positioned at locations where the measured temperature is greater than a predefined temperature threshold. In another example, the one or more controllers 206 can be configured to close third valves 202 associated with flexible storage vessels 132 positioned at locations where the measured temperature is less than the predefined temperature threshold. In further example, the one or more controllers 206 can be configured to open third valves 202 associated with flexible storage vessels 132 having an internal pressure less than a predefined pressure threshold. In a still further example, the one or more controllers 206 can be configured to close third valves 202 associated with flexible storage vessels 132 having an internal pressure that is equal to or greater than the predefined pressure threshold. In yet another example, the one or more controllers 206 can be configured to open one or more fourth valves 204 based on a flexible storage vessel 132 having an internal pressure equal to or greater than the predefined pressure threshold (e.g., to alleviate pressure). In an additional example, the controller 206 can be configured to open or close one or more of the third valves 202 and/or fourth valves 204 in accordance with a defined schedule (e.g., a maintenance schedule). Thus, in one or more embodiments, the one or more controllers 206 can be configured to control the distribution of the cooled compressed gas stream 122 amongst and/or between flexible storage vessels 132 so as to: optimize the amount of energy stored by the energy storage system 100 by directing the stored gas to high temperature locations; and/or maintain a structural integrity of the energy storage system 100 by keeping the flexible storage vessels 132 within safe pressurizations.

Figure 3:
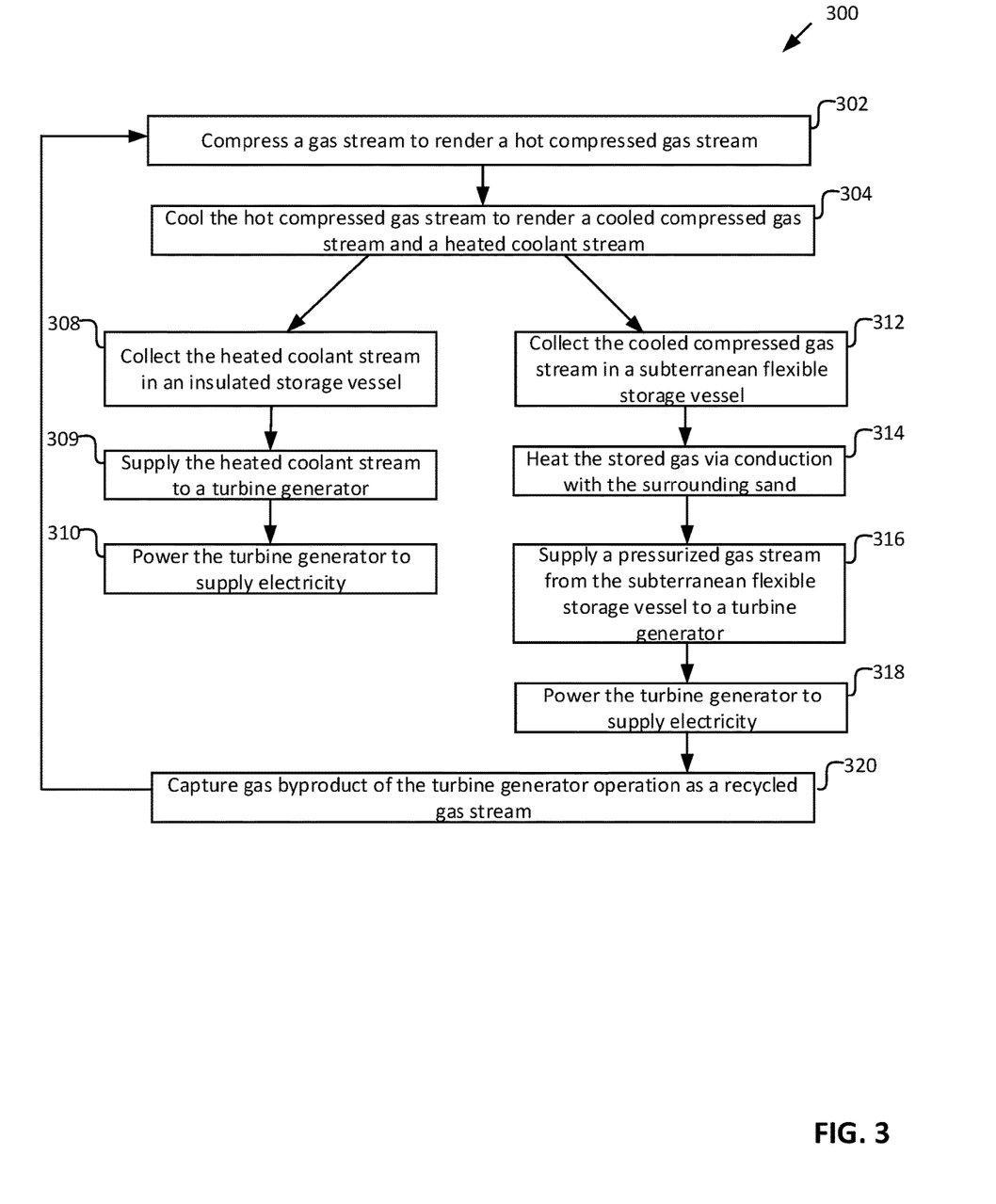
FIG. 3 is a flow diagram of a non-limiting example method for storing excess energy via compressed gas held in a subterraneous desert environment in accordance with one or more embodiments described herein.

FIG. 3 illustrates a flow diagram of a non-limiting method 300 that can be implemented via system 100 to store energy in desert environments in accordance with one or more embodiments described herein.

At 302, the method 300 can comprise compressing a gas stream 104 to render a hot compressed gas stream 112. For example, the gas stream 104 can be compressed via one or more compressor units 106, powered by one or more energy suppliers 108 in accordance with one or more embodiments described herein. In one or more embodiments, the gas stream 104 can comprise manufactured carbon dioxide gas, and the one or more energy suppliers 108 can be clean energy suppliers.

At 304, the method 300 can comprise cooling the hot compressed gas stream 112 to render a cooled compressed gas stream 122 and a heated coolant stream 120. For example, the hot compressed gas stream 112 can be cooled via one or more heat exchangers 114, where a coolant stream 116 can absorb heat from the hot compressed gas stream 112 to become the heated coolant stream 120. In one or more embodiments, the heat exchanger 114 can be a shell and tube heat exchanger.

At 308, the method 300 can comprise collecting the heated coolant stream 120 in an insulated storage vessel 124. Further, at 309, the method 300 can comprise supplying the heated coolant stream 120 to a turbine generator 102 (e.g., a first turbine generator 102a). For instance, the coolant stream 116 can be water, the heated coolant stream 120 can be steam, and the turbine generator 102 can be a steam-driven turbine generator. At 310, the method 300 can comprise powering the turbine generator 102 to supply electricity to one or more energy destinations 128 (e.g., such as a power grid, battery, and/or electrical device). In one or more embodiments, the method 300 can further comprise capturing a gas byproduct (e.g., residual steam) from operation of the turbine generator 102 as a recycled coolant stream 130, and supplying the recycled coolant stream 130 to a coolant supply 118 (e.g., after one or more cooling operations, such as a condensing operation).

At 312, the method 300 can comprise collecting the cooled compressed gas stream 122 in one or more subterranean flexible storage vessels 132. For example, the one or more heat exchangers 114 can be coupled to one or more flexible storage vessels 132 that are at least partially surrounded by a body of desert sand 134. For instance, the one or more heat exchangers 114 can be coupled to a plurality of subterranean flexible storage vessels 132 buried in the sand 134 to a depth D of at least 0.5 meters. In one or more embodiments, the cooled compressed gas stream 122 can be supplied to respective subterranean flexible storage vessels 132 based on the temperature and/or pressure of the flexible storage vessels 132. For instance, one or more controllers 206 can control the operation of two or more third valves 202 based on the temperature and/or pressure data captured by sensor units 210, where the third valves 202 can regulate the supply of the cooled compressed gas stream 122 in accordance with one or more embodiments described herein.

At 314, the method 300 can comprise heating the stored gas via conduction with the surrounding sand 134. For example, the sand 134 may be heated by the Sun and/or by one or more geothermal activities. Further, the one or more subterranean flexible storage vessels 132 can be in direct contact with the sand 134, and thereby can be heated by the sand 134 via conduction. As the stored gas is heated by the sand 134, pressure within the one or more subterranean flexible storage vessels 132 can increase.

At 316, the method 300 can comprise supplying a pressurized gas stream 136 from one or more flexible storage vessels 132 to a turbine generator 102 (e.g., a second turbine generator 102b). For example, the pressurized gas stream 136 can be pressurized carbon dioxide, and the turbine generator 102 can be a carbon dioxide-driven turbine generator. In one or more embodiments, the one or more supplying at 316 can be controlled and/or regulated by one or more second valves 138 coupled between the one or more subterranean flexible storage vessels 132 and turbine generators 102.

At 318, the method 300 can comprise powering the turbine generator 102 to supply electricity to one or more energy destinations 128 (e.g., such as a power grid, battery, and/or electrical device). At 320, the method 300 can comprise capture a gas byproduct (e.g., residual carbon dioxide) of the turbine generator 102 operation as a recycled gas stream 140. Further, the method 300 can proceed back to 302, where the recycled gas stream 140 can be, or can be integrated with, the gas stream 104.

Additional Embodiments

The present disclosure is also directed to the following exemplary embodiments, which can be practiced in any combination thereof:

Embodiment 1: A system for subterranean energy storage, the system comprising: a subterranean flexible storage vessel coupled to a heat exchanger, wherein the heat exchanger is configured to supply a cooled compressed gas stream to the subterranean flexible storage vessel, wherein the subterranean flexible storage vessel is at least partially surrounded by sand; and a turbine generator coupled to the subterranean flexible storage vessel, wherein the subterranean flexible storage vessel is configured to supply a pressurized gas stream that is heated by the sand to the turbine generator.

Embodiment 2: The system of embodiment 1, wherein the pressurized gas stream powers the turbine generator to supply electricity to a power grid, battery, or electrical device.

Embodiment 3: The system of embodiment 1 or 2, further comprising: a compressor unit coupled to the heat exchanger, wherein the compressor unit is configured to compress a gas stream into a hot compressed gas stream that is supplied to the heat exchanger.

Embodiment 4: The system of any of embodiments 1-3, further comprising: a pipe circuitry configured to capture a recycled gas stream from the turbine generator and supply the recycled gas stream to the compressor unit.

Embodiment 5: The system of any of embodiments 1-4, further comprising: an insulated storage vessel configured to supply a heated coolant stream to a second turbine generator, wherein the heated coolant stream is a product of the heat exchanger removing heat from a hot compressed gas stream to render the cooled compressed gas stream.

Embodiment 6: The system of any of embodiments 1-5, wherein the subterranean flexible storage vessel comprises an elastic inner layer and a rigid outer layer.

Embodiment 7: The system of any of embodiments 1-6, wherein the elastic inner layer is an elastic airbag and the rigid outer layer is a shell composed of a metal, a ceramic, or a polymer.

Embodiment 8: A method for subterranean energy storage, the method comprising: cooling a hot compressed gas stream via a heat exchanger to form a cooled compressed gas stream; supplying the cooled compressed gas stream to a subterranean flexible storage vessel that is at least partially surrounded by sand, wherein the subterranean flexible storage vessel is coupled to a turbine generator; and heating the cooled compressed gas stream within the subterranean flexible storage vessel via conduction with the sand, wherein the heating pressurizes the subterranean flexible storage vessel.

Embodiment 9: The method of embodiment 8, further comprising: supplying a pressurized gas stream from the subterranean flexible storage vessel to the turbine generator, wherein the pressurized gas stream powers the turbine generator to supply electricity to a power grid, battery, or electrical device.

Embodiment 10: The method of embodiment 8 or 9, wherein the pressurized gas stream powers the turbine generator to supply electricity to a power grid, battery, or electrical device.

Embodiment 11: The method of any of embodiments 8-10, further comprising: capturing a gas byproduct from operation of the turbine generator as a recycled gas stream; and supplying the recycled gas stream to a compressor to render the hot compressed gas stream.

Embodiment 12: The method of any of embodiments 8-11, further comprising: compressing a gas stream via a compressor unit to render the hot compressed gas stream, wherein the gas stream comprises carbon dioxide.

Embodiment 13: The method of any of embodiments 8-12, wherein the subterranean flexible storage vessel is from a plurality of subterranean flexible storage vessels coupled to the heat exchanger, and wherein the supplying the cooled compressed gas stream to the subterranean flexible storage vessel is based on a measured temperature of the sand.

Embodiment 14: A system for subterranean energy storage, the system comprising: a flexible storage vessel positioned within a body of desert sand, wherein the flexible storage vessel is configured to hold a cooled compressed gas; a turbine generator coupled to the flexible storage vessel, wherein the cooled compressed gas is pressurized by conduction heating from the body of desert sand to render a pressurized gas; and a valve configured to control supply of the pressurized gas to the turbine generator.

Embodiment 15: The system of embodiment 14, wherein the flexible storage vessel is buried within the body of desert sand to a depth of at least 0.5 meters.

Embodiment 16: The system of embodiment 14 or 15, further comprising: a compressor unit configured to compress a gas stream to render a hot compressed gas stream; and a heat exchanger configured to cool the hot compressed gas stream to render the cooled compressed gas.

Embodiment 17: The system of any of embodiments 14-16, further comprising: a pipe circuitry configured to capture a recycled gas stream from the turbine generator and supply the recycled gas stream to the compressor unit.

Embodiment 18: The system of any of embodiments 14-17, further comprising: an insulated storage vessel configured to supply a heated coolant stream to a second turbine generator, wherein the heated coolant stream is a product of the heat exchanger removing heat from the hot compressed gas stream to render the cooled compressed gas.

Embodiment 19: The system of any of embodiments 14-18, wherein the flexible storage vessel is from a plurality of flexible storage vessels coupled to the heat exchanger, and wherein the system further comprises: a second valve configured to control supply of the cooled compressed gas to the flexible storage vessel; and a third valve configured to control supply of the cooled compressed gas to a second flexible storage vessel from the plurality of flexible storage vessels.

Embodiment 20: The system of any of embodiments 14-19, further comprising a controller operably coupled to the second valve and the third valve, wherein the controller is configured to control operation of the second valve and operation of the third valve based on: a temperature of sand adjacent to the flexible storage vessel, a temperature of sand adjacent to the second flexible storage vessel, or a combination thereof.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A system for subterranean energy storage, the system comprising:
    a subterranean flexible storage vessel coupled to a heat exchanger, wherein the heat exchanger is configured to supply a cooled compressed gas stream to the subterranean flexible storage vessel, wherein the subterranean flexible storage vessel is at least partially surrounded by sand;
    a turbine generator coupled to the subterranean flexible storage vessel, wherein the subterranean flexible storage vessel is configured to supply a pressurized gas stream that is heated by the sand to the turbine generator; and
    a second turbine generator coupled to an insulated storage vessel, wherein the insulated storage vessel supplies a heated coolant stream byproduct of the heat exchanger removing heat from a hot compressed gas stream to render the cooled compressed gas stream.

2. The system of claim 1, wherein the pressurized gas stream powers the turbine generator to supply electricity to a power grid, battery, or electrical device.

3. The system of claim 1, further comprising:
    a compressor unit coupled to the heat exchanger, wherein the compressor unit is configured to compress a gas stream into a hot compressed gas stream that is supplied to the heat exchanger.

4. The system of claim 3, further comprising:
    a pipe circuitry configured to capture a recycled gas stream from the turbine generator and supply the recycled gas stream to the compressor unit.

5. The system of claim 1, wherein the subterranean flexible storage vessel comprises an elastic inner layer and a rigid outer layer.

6. The system of claim 5, wherein the elastic inner layer is an elastic airbag and the rigid outer layer is a shell composed of a metal, a ceramic, or a polymer.

7. A method for subterranean energy storage, the method comprising:
    cooling a hot compressed gas stream via a heat exchanger to form a cooled compressed gas stream;
    supplying the cooled compressed gas stream to a subterranean flexible storage vessel that is at least partially surrounded by sand, wherein the subterranean flexible storage vessel is coupled to a turbine generator;
    supplying a heated coolant stream from an insulated storage vessel to a turbine generator, wherein the heated coolant stream is a product of the heat exchanger removing heat from a hot compressed gas stream to render the cooled compressed gas stream; and
    heating the cooled compressed gas stream within the subterranean flexible storage vessel via conduction with the sand, wherein the heating pressurizes the subterranean flexible storage vessel.

8. The method of claim 7, further comprising:
    supplying a pressurized gas stream from the subterranean flexible storage vessel to the turbine generator, wherein the pressurized gas stream powers the turbine generator to supply electricity to a power grid, battery, or electrical device.

9. The method of claim 8, wherein the pressurized gas stream powers the turbine generator to supply electricity to a power grid, battery, or electrical device.

10. The method of claim 8, further comprising:
    capturing a gas byproduct from operation of the turbine generator as a recycled gas stream; and
    supplying the recycled gas stream to a compressor to render the hot compressed gas stream.

11. The method of claim 7, further comprising:
    compressing a gas stream via a compressor unit to render the hot compressed gas stream, wherein the gas stream comprises carbon dioxide.

12. The method of claim 7, wherein the subterranean flexible storage vessel is from a plurality of subterranean flexible storage vessels coupled to the heat exchanger, and wherein the supplying the cooled compressed gas stream to the subterranean flexible storage vessel is based on a measured temperature of the sand.

13. A system for subterranean energy storage, the system comprising:
    a flexible storage vessel positioned within a body of desert sand, wherein the flexible storage vessel is configured to hold a cooled compressed gas;
    a turbine generator coupled to the flexible storage vessel, wherein the cooled compressed gas is pressurized by conduction heating from the body of desert sand to render a pressurized gas;
    a compressor unit configured to compress a gas stream to render a hot compressed gas stream;
    a heat exchanger configured to cool the hot compressed gas stream to render the cooled compressed gas;
    an insulated storage vessel configured to supply a heated coolant stream to a second turbine generator, wherein the heated coolant stream is a product of the heat exchanger removing heat from the hot compressed gas stream to render the cooled compressed gas; and
    a valve configured to control supply of the pressurized gas to the turbine generator.

14. The system of claim 13, wherein the flexible storage vessel is buried within the body of desert sand to a depth of at least 0.5 meters.

15. The system of claim 13, further comprising:
a pipe circuitry configured to capture a recycled gas stream from the turbine generator and supply the recycled gas stream to the compressor unit.

16. A system for subterranean energy storage system, the system comprising:
a flexible storage vessel positioned within a body of desert sand, wherein the flexible storage vessel is configured to hold a cooled compressed gas, wherein the flexible storage vessel is from a plurality of flexible storage vessels coupled to the heat exchanger;
a turbine generator coupled to the flexible storage vessel, wherein the cooled compressed gas is pressurized by conduction heating from the body of desert sand to render a pressurized gas;
a compressor unit configured to compress a gas stream to render a hot compressed gas stream;
a heat exchanger configured to cool the hot compressed gas stream to render the cooled compressed gas;
a valve configured to control supply of the pressurized gas to the turbine generator;
a second valve configured to control supply of the cooled compressed gas to the flexible storage vessel; and
a third valve configured to control supply of the cooled compressed gas to a second flexible storage vessel from the plurality of flexible storage vessels.

17. The system of claim 16, further comprising a controller operably coupled to the second valve and the third valve, wherein the controller is configured to control operation of the second valve and operation of the third valve based on: a temperature of sand adjacent to the flexible storage vessel, a temperature of sand adjacent to the second flexible storage vessel, or a combination thereof.

\* \* \* \* \*